March 31, 1942.    J. C. HUNTER    2,278,391
COMBINATION WINDOW SHELF AND FLOWER POT SUPPORT
Filed Aug. 26, 1940
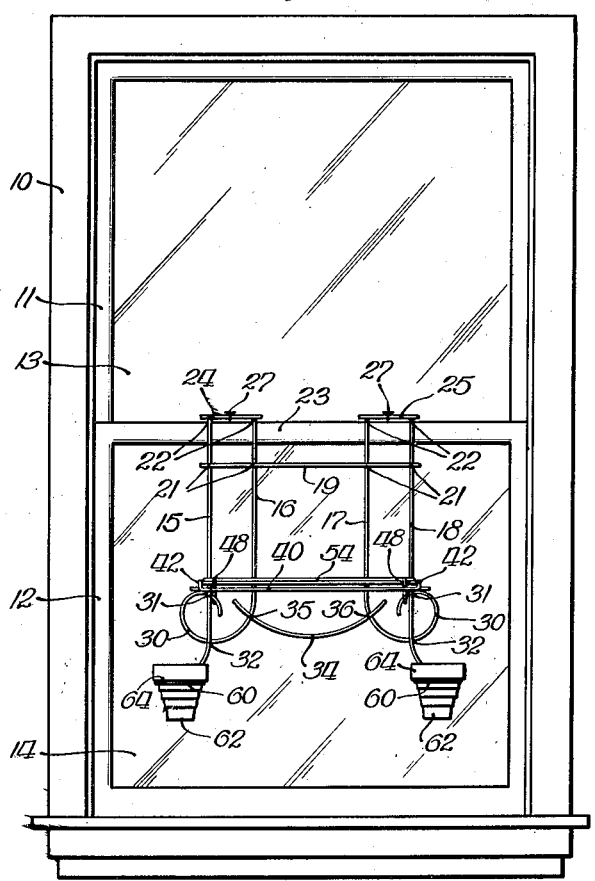
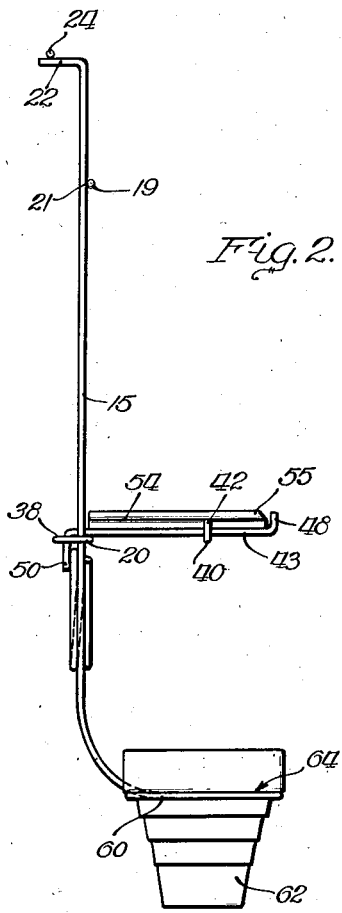
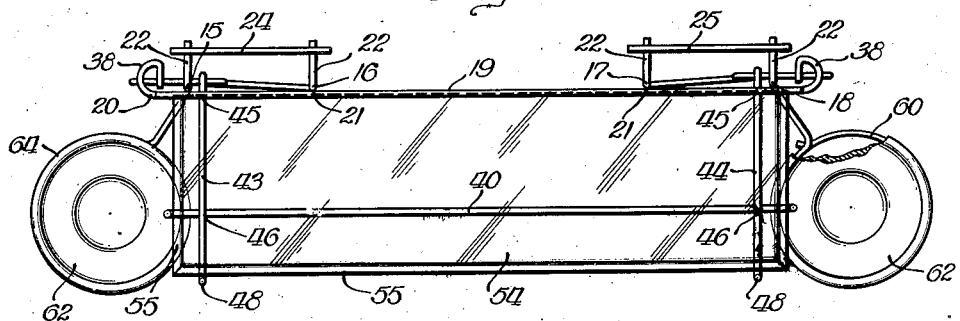
INVENTOR.
John C. Hunter
BY
Brown, Jackson, Boettcher & Dienner
Attys.

Patented Mar. 31, 1942

2,278,391

UNITED STATES PATENT OFFICE 2,278,391

COMBINATION WINDOW SHELF AND FLOWERPOT SUPPORT

John C. Hunter, Cincinnati, Ohio, assignor, by mesne assignments, to Adolph J. Havlis, Frank Havlis, Albert F. Havlis, Albina Zderad, and Stanley P. Dyba, copartners, doing business as Keystone Metal Products Company, a limited partnership Application August 26, 1940, Serial No. 354,192

4 Claims. (Cl. 211—90)

This invention relates to a combination window shelf and flower pot support and has to do particularly with an improved wire window shelf and flower pot support.

One of the main objects of the invention is to provide an improved combination window shelf and flower pot support which is adapted to be easily applied to the window sash in position so that it not only will be seen and present an appearance of highly pleasing character and utility on the inside of the window but will also present an appearance of pleasing character when viewed from the outside.

Another object of the invention is to provide an improved window shelf and flower pot support in which the shelf and flower pot support are so combined that the shelf for supporting objects as desired will not interfere with growing plants, flowers, or the like supported by the device and particularly a device of the class described in which the flower pots are supported below and off to one side or beyond the ends of the shelf so that the flowers will not strike the shelf or be injured or have their growth impaired by the shelf.

Another object of the invention is to provide a device of simple and inexpensive construction and pleasing appearance and a device composed of relatively few parts adapted to be manufactured and assembled expeditiously.

Further objects and advantages of the invention will be apparent from the following detailed description taken in connection with the accompanying drawing in which:

Figure 1 is a view of the inner side of a window showing a combination window shelf and flower pot support embodying the present invention applied thereto;

Figure 2 is a side view of the combination window shelf and flower pot support; and Figure 3 is a plan view of the device.

Referring now in detail to the drawing, the window shown in Figure 1 is the usual or any suitable window provided, for example, with a frame 10 in which are set movable upper and lower sashes 11 and 12. The sashes 11 and 12 contain panes 13 and 14 of glass or other transparent material.

The combination window shelf and flower pot support is formed of wire and comprises two pairs of generally vertical wires 15, 16 and 17, 18, one pair at each of the opposite sides of the device.

A pair of generally horizontal wires 19 and 20 extends across and are welded or otherwise secured at 21 to the wires 15, 16 and 17, 18 thereby joining the parts described into a unitary structure.

The wires 15, 16 and 17, 18 extend vertically and are substantially parallel from the lower cross wire 20 upwardly to their upper ends. The upper ends of the wires 15, 16 and 17, 18 are turned outwardly at 22 to rest, for example, upon the upper surface of the upper horizontal member 23 of the lower window sash 12 and thereby to support the device in position within the area of the window pane 14 so that the device may be seen not only from the inside but also from the outside. The upper outturned ends 22 of the wires 15, 16 and the upper outturned ends of the wires 17, 18 are joined by short individual horizontally disposed wires 24 and 25 welded or otherwise secured to the wires 15, 16 and 17, 18, respectively. The device may be securely retained in place in the window by applying, for example, tacks, nails, or other means indicated at 27 to the upper surface of the horizontal member 23 of the sash 12 inwardly of the individual cross wires 24 and 25.

The lower ends of the wires 16 and 17 beneath the lower cross wire 20 are turned or convoluted outwardly to provide scroll-like or convoluted ornamentations at 30. The convoluted portions 30 are welded or otherwise secured at 31 and 32 to the outer vertical wires 15 and 18. A downwardly bowed segment shaped wire 34 is arranged across the convoluted portions 30 of the wires 16 and 17 below the shelf and is welded or secured at 35 and 36 to the wires 16 and 17. The opposite ends of the lower cross wire 20 are looped outwardly at 38 or otherwise formed to engage the window pane 14 when the device is applied to the window thereby maintaining the desired spacing of the lower part of the device from the window.

In substantially the horizontal plane of the lower cross wire 20, and spaced inwardly therefrom, is a horizontal shelf supporting wire 40, the opposite ends of which are turned upwardly at 42. Inwardly extending parallel and substantially horizontal shelf supporting wires 43 and 44 are disposed across the tops of the wires 20 and 40 and are welded or secured at 45, 46 to these wires to join the wire 40 as a unit to the other parts of the device. The outer ends of the wires 43, 44 are turned upwardly at 48 similar to the up-turned ends 42 of the wire 40 and the inner ends of the wires 43, 44 may be turned downwardly at 50 to clear the window pane 14.

The shelf 54 may be made of glass or other suitable material and preferably has at least its outer and end edges beveled at 45. This shelf 54 is retained in place and particularly against sidewise and endwise displacement by the wires 15, 16 and 17, 18 and by the upturned ends 42 and 48 of the wires 40 and 43, 44.

The lower ends of the outer vertical wires 15 and 18 below the shelf 54 are curved or turned outwardly and inwardly and terminate in integral annular flower pot supporting loops 60 below and beyond the ends of the shelf 54. The flower pots 62, which may be of the usual or any suitable form, have rims or shoulders 64 near their upper ends and may be colored and decorated as desired. These flower pots, which may be filled with earth for growing plants, are placed in the loops 60 with the rims or shoulders 64 engaging the loops 60 to support the flower pots as shown.

With the flower pots 62 thus supported below and beyond the ends or side of the shelf 54, the shelf and flower pot support are combined and at the same time the flowers or growing plants will not strike the shelf or be injured or have their growth in anywise impaired by the shelf. Any suitable or desired ornamental, decorative, or other articles may be supported upon the shelf 54.

The embodiment of the invention shown in the drawing is for illustrative purposes only and it is to be expressly understood that said drawing and the accompanying specification are not to be construed as a definition of the limits or scope of the invention, reference being had to the appended claims for that purpose.

I claim:

1. In a device of the class described in combination, upright wires turned outwardly at their upper ends for support upon a window sash or equivalent object, cross wires extending across and joined to said upright wires, a shelf supported in generally horizontal position by said upright wires, the lower ends of said upright wires extending downwardly beneath said shelf and turned outwardly, and generally horizontally disposed supports carried by the lower ends of the outwardly turned ends of said upright wires and disposed below and beyond the ends of said shelf for supporting articles in position to extend upwardly above the plane of the shelf without being obstructed by said shelf.

2. A combination window shelf and flower pot support comprising upright wires turned outwardly at their upper ends for support upon a window sash or equivalent object, cross wires extending across and joined to said upright wires, a shelf supported in generally horizontal position by said upright wires, the lower ends of said upright wires extending downwardly beneath said shelf and turned outwardly and generally horizontally disposed loops at the lower ends of the outwardly turned ends of said upright wires and disposed below and beyond the ends of said shelf for supporting flower pots in position so that the flowers may extend upwardly above the plane of the shelf without being obstructed by said shelf, one of said cross wires having its opposite ends turned outwardly to engage the window and to space the lower portion of the device therefrom.

3. A combination window shelf and flower pot support comprising upright wires turned outwardly at their upper ends for support upon a window sash or equivalent object, upper and lower cross wires extending across and joined to said upright wires, a generally horizontal wire spaced outwardly from the lower cross wire, inwardly extending shelf supporting wires extending across and joined to said lower cross wire and to said generally horizontal inwardly spaced wire, a shelf supported by said shelf supporting wires, said shelf supporting wires and said generally horizontally disposed and inwardly spaced wires having their ends turned upwardly to hold said shelf against sidewise and endwise displacement, the lower ends of said upright wires extending downwardly below said shelf, and generally horizontally disposed loops at the lower ends of said upright wires and disposed below and outwardly of said shelf for supporting flower pots in position so that the flowers may extend upwardly above the plane of the shelf without being obstructed by said shelf.

4. A combination window shelf and flower pot support comprising two pairs of upright wires, one pair at each side of the device, the upper ends of said upright wires being turned outwardly for support upon a window sash or equivalent object, cross wires extending across and joined to said upright wires, a shelf supported in generally horizontal position by said upright wires, the lower end of each outer upright wire extending downwardly below said shelf, and generally horizontally disposed loops at the lower ends of said downwardly extending wires and disposed below and outwardly of said shelf for supporting the flower pots in position so that the flowers may extend upwardly above the plane of the shelf without being obstructed by said shelf, the lower ends of the inner upright wires below said shelf being convoluted and joined to the outer upright wires.

JOHN C. HUNTER.